(12) United States Patent
Kawamoto et al.

(10) Patent No.: US 10,514,281 B2
(45) Date of Patent: Dec. 24, 2019

(54) IMPELLER-TYPE FLOWMETER HAVING A RESIN CASE WITH INSULATING MATERIAL ARRANGED BETWEEN A METAL COIL CASE AND AN AMPLIFIER CASE

(71) Applicant: TOFLO CORPORATION, Hino-shi, Tokyo (JP)

(72) Inventors: Takahiro Kawamoto, Hino (JP); Tetsuaki Sekine, Hino (JP); Shinji Tobimatsu, Hino (JP)

(73) Assignee: TOFLO CORPORATION, Tokyo (JP)

( * ) Notice: Subject to any disclaimer, the term of this patent is extended or adjusted under 35 U.S.C. 154(b) by 29 days.

(21) Appl. No.: 16/026,972

(22) Filed: Jul. 3, 2018

(65) Prior Publication Data

US 2019/0128712 A1 May 2, 2019

(30) Foreign Application Priority Data

Nov. 2, 2017 (JP) .................................. 2017-212433

(51) Int. Cl.
*G01F 1/115* (2006.01)
*G01F 1/24* (2006.01)

(52) U.S. Cl.
CPC .................................... *G01F 1/115* (2013.01)

(58) Field of Classification Search
None
See application file for complete search history.

(56) References Cited

U.S. PATENT DOCUMENTS

| 4,678,992 A * | 7/1987 | Hametta | G01F 1/115 |
| | | | 324/173 |
| 5,197,337 A * | 3/1993 | Glasheen | G01D 5/2013 |
| | | | 324/174 |
| 2018/0087938 A1* | 3/2018 | Neilson | G01F 1/115 |

FOREIGN PATENT DOCUMENTS

| JP | H10-054742 A | 2/1998 |
| JP | 2006-284320 | * 10/2006 | ............... G01F 1/00 |

* cited by examiner

*Primary Examiner* — Harshad R Patel
(74) *Attorney, Agent, or Firm* — Muncy, Geissler, Olds & Lowe, P.C.

(57) ABSTRACT

A flowmeter includes a metallic body that has a flow path therein, an impeller that is rotatably supported in the flow path inside the body, a pickup coil that is configured to detect a number of rotations of the impeller, the pickup coil being disposed outside the body, a coil case that is made of metal, and accommodates the pickup coil, an amplifier circuit board that is configured to amplify a detection signal of the pickup coil, and an amplifier case that is made of resin, and accommodates the amplifier circuit board. The coil case and the amplifier case are connected via a resin case that is made of resin and includes an insulation material therein.

9 Claims, 6 Drawing Sheets

IMPELLER-TYPE FLOWMETER HAVING A RESIN CASE WITH INSULATING MATERIAL ARRANGED BETWEEN A METAL COIL CASE AND AN AMPLIFIER CASE

TECHNICAL FIELD

The present invention relates to an impeller-type flowmeter for measuring a flow rate of a fluid based on the number of rotations of an impeller, and particularly to a structure of the impeller-type flowmeter capable of coping with an abrupt temperature change of a fluid.

BACKGROUND

Conventionally, as a flowmeter of this kind, for example, an impeller-type flowmeter described in the following Patent Document 1 is known. The flowmeter is for detecting a rotation of an impeller with a magnetic sensor, and between a measuring chamber in which the impeller is disposed and the magnetic sensor, a heat insulating plate made of synthetic resin is arranged and a heat insulating air chamber is formed. Also, at the portion constituting the outer peripheral wall of the heat insulating air chamber, a heat radiating vent hole which allows air to come in and out between the heat radiation air chamber and the outside and a heat radiation fin are provided (see FIG. 1 of Patent Document 1).

RELATED ART

[Patent Doc. 1] JP Laid-Open Application Publication H10-054742

SUBJECTS TO BE SOLVED

According to the flowmeter described in the aforementioned Patent Document 1, since the heat insulating plate is provided between the measuring chamber and the magnetic sensor, it is possible to prevent the heat from being directly transmitted from the fluid flowing through the measuring chamber to the magnetic sensor by conduction.

However, since the heat insulating air chamber is provided between the measuring chamber and the magnetic sensor, the air in the chamber gets heated, causing convection. Due to this convection, heat is transmitted to the metallic side wall of the sensor accommodation chamber accommodating the magnetic sensor, which causes a problem that the temperature of the magnetic sensor inside the sensor accommodation chamber rises due to the heat radiation.

Also, when the temperature of the fluid flowing through the measuring chamber drops abruptly, the warm air in the sensor accommodation chamber is cooled, causing condensation. Due to the water droplet of the condensation, it is conceivable to cause a problem that the conducting wire of the magnetic sensor gets rusted to cause a contact failure, resulting in a failure of the magnetic sensor.

Under the circumstances, the present invention has been made in view of the aforementioned problems and an object thereof is to provide a flowmeter capable of measuring a flow rate of a fluid in a wide range of temperature from a low temperature to a high temperature even when there is an abrupt change in the temperature of a fluid in an impeller-type flowmeter.

SUMMARY

A flowmeter disclosed in the application includes a metallic body that has a flow path therein, an impeller that is rotatably supported in the flow path inside the body, a pickup coil that is configured to detect a number of rotations of the impeller, the pickup coil being disposed outside the body, a coil case that is made of metal, and accommodates the pickup coil, an amplifier circuit board that is configured to amplify a detection signal of the pickup coil, and an amplifier case that is made of resin, and accommodates the amplifier circuit board. The coil case and the amplifier case are connected via a resin case that is made of resin and includes an insulation material therein.

In another invention, the coil case is arranged at a connection portion of the body and the resin case, a ground conducting wire of the pickup coil is connected to an inner side of the coil case, and the coil case is filled with a heat-resistant material therein and connected to the body such that the ground conducting wire is electrically connected to the body via the coil case.

In another invention, a supporting frame that supports the impeller is fixed in the flow path with a curved retaining ring.

In another invention, a bearing that supports a rotation shaft of the impeller is made of resin and fixed to the supporting frame with a push nut.

In another invention, a rotational flow plate that constitutes the supporting frame is molded by metal injection molding using nonmagnetic metal.

In another invention, a rotation shaft and a wing part that constitute the impeller are integrally molded by metal injection molding using nonmagnetic metal as a material.

According to the flowmeter of the present invention, since the coil case and the amplifier case are connected via the case made of resin, the direct transfer of the temperature from the body to the amplifier circuit board can be prevented. Further, since the insulation material is provided inside the case, no convection of air occurs in the space inside the case, and when a high temperature fluid flows through the flow path, the heat transfer to the amplifier circuit board can be prevented, and on the other hand, when a low temperature fluid flows through the flow path, condensation of the amplifier circuit board can be prevented.

According to the flowmeter of the present invention, since the metallic oil case is interposed at the connection portion of the case and the body, the coil case acts as a buffering material to prevent damage to the case due to heat shock. Furthermore, since the ground conducting wire is conducted to the body via the coil case, the detection signal of the coil is less likely to be affected by disturbance noise, and since the inside of the coil case is filled with the heat-resistant material, even if the body condenses due to a low temperature fluid, the ground conducting wire will not get rusted and no contact failure will occur, so that the pickup coil can be operated accurately for a long period of time.

According to the flowmeter of the present invention, since the supporting frame supporting the impeller is fixed to the flow path with the curved retaining ring, loosening of the screw, peeling of adhesives, etc., do not occur even if heat shrinkage occurs due to the temperature difference of the fluid, and rattling of the supporting frame in the flow path can be suppressed, which prevents the displacement in the thrust direction.

According to the flowmeter of the aforementioned present invention, since the bearing supporting the rotation shaft of the impeller is made of resin and is fixed to the supporting frame with a push nut, the bearing would not come off even if an abrupt temperature change of the fluid occurs, which enables stable support of the impeller.

According to the flowmeter of the aforementioned present invention, since the rotational flow plate is formed by metal injection molding using nonmagnetic metal as a material, a rotational flow structure having a heat resistance and a complex shape can be realized with high accuracy.

According to the flowmeter of the aforementioned present invention, since the rotation shaft and the wing part constituting the impeller are integrally formed by metal injection molding using nonmagnetic metal as a material, a complex shaped impeller can be formed with high accuracy.

DETAILED DESCRIPTIONS OF PREFERRED EMBODIMENT(S)

Next, embodiments for carrying out the present invention will be described with reference to the drawings.

Figure 1:
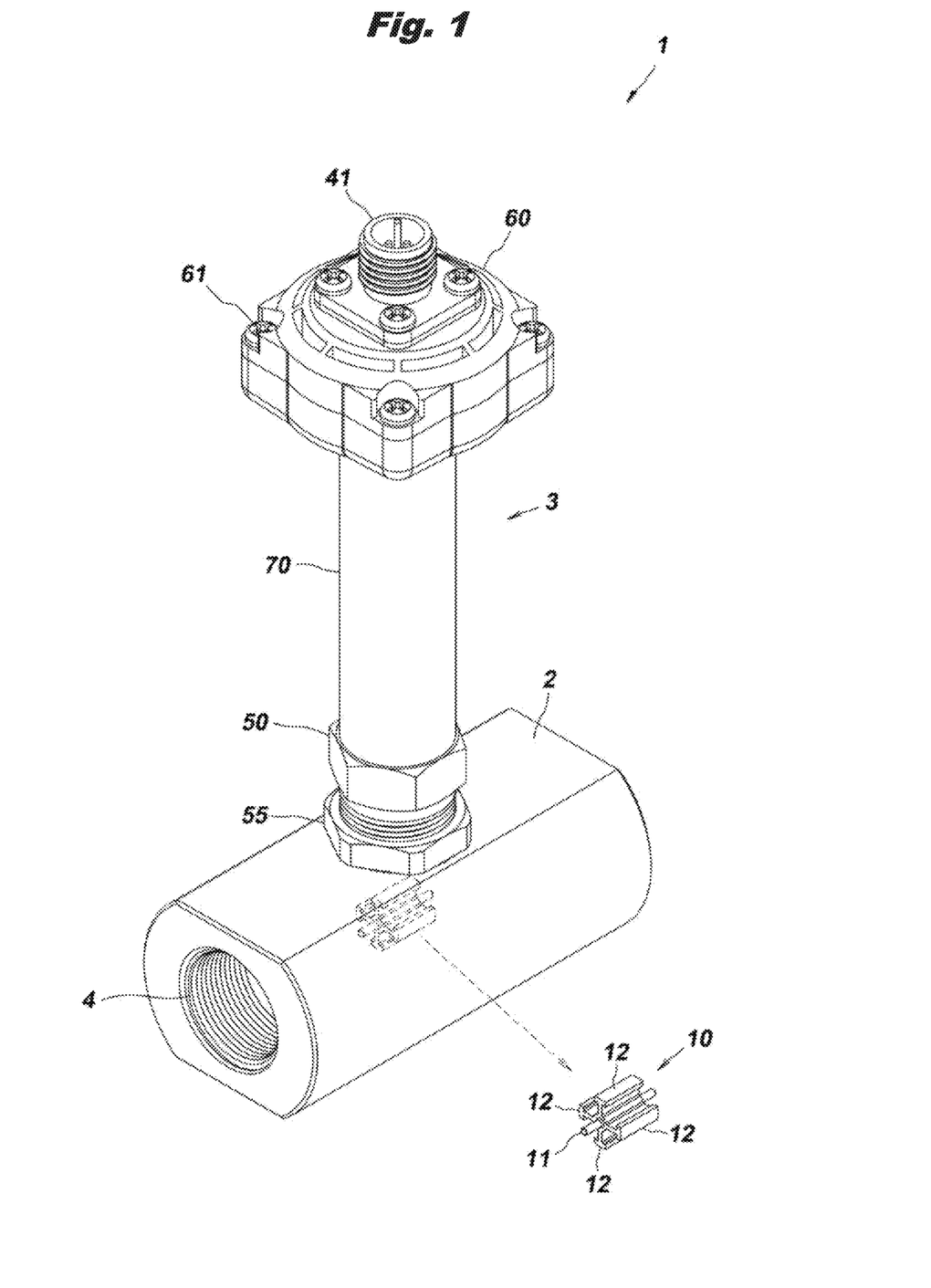
FIG. 1 is a perspective view showing the outer appearance of the flowmeter according to the present invention.

As shown in FIG. 1, the flowmeter 1 of this embodiment is an axial flow impeller (turbine) type flowmeter configured to measure a flow rate of a fluid based on the number of rotations of an impeller 10 built in the body 2, and a sensor-amplifier integrated type flowmeter in which a sensor unit 3 composed of a magnetic sensor for detecting the number of rotations of the impeller 10 and an amplifier are attached to the body 2. As an application of the flowmeter 1, for example, it can be used for measuring a flow rate of a fluorine-based inert fluid by attaching to a horizontal pipe of a temperature control chiller of a semiconductor manufacturing equipment. Further, the flow rate can be measured in a wide range of temperature between the fluid temperatures of at least from a very low temperature of −80° C. to a high temperature of +200° C.

Figure 2:
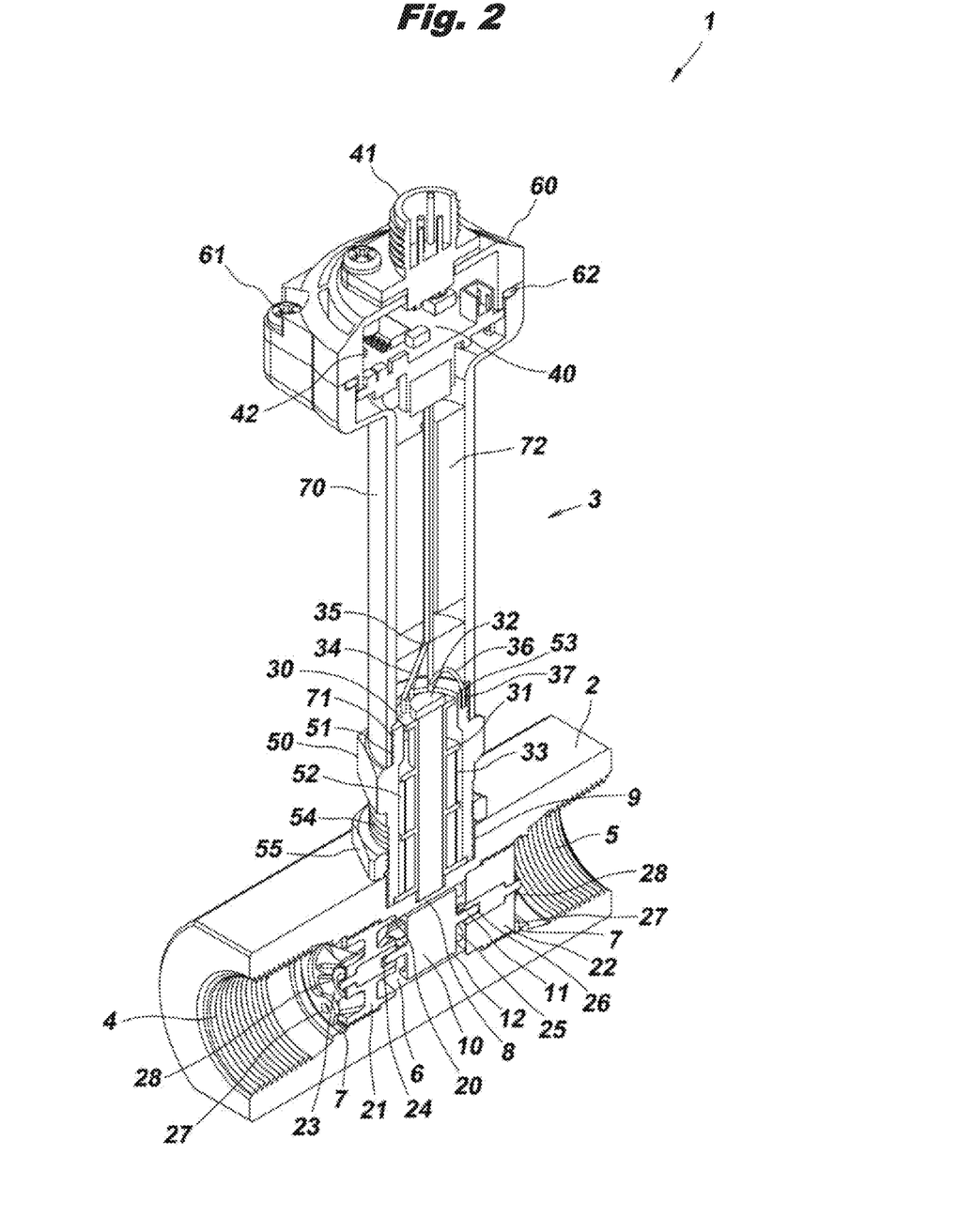
FIG. 2 is a perspective cross-sectional diagram showing the internal structure of the flowmeter of FIG. 1.
Figure 3:
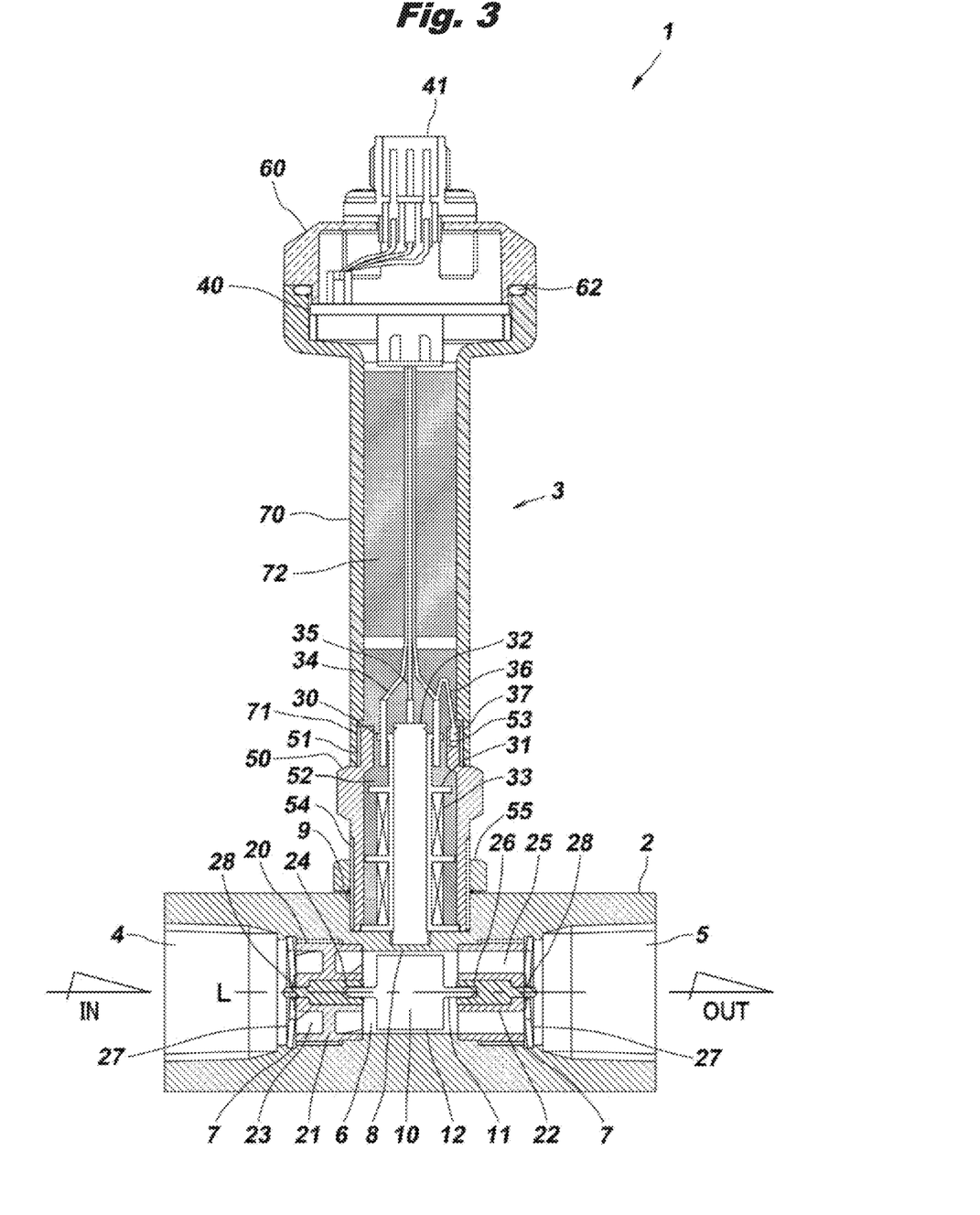
FIG. 3 is a cross-sectional plan view showing the internal structure of the flowmeter.

As shown in FIG. 2 and FIG. 3, the flowmeter 1 is equipped with a metallic body 2 made of stainless steel (for example, SUS304). Inside the body 2, a flow path 6 is provided, in which an inlet 4 opening to one end and an outlet 5 opening to the other end are in communication and a fluid flows from the inlet 4 to the outlet 5. Inside the flow path 6, an impeller 10 having an axis parallel to the direction in which a fluid flows is rotatably supported by a supporting frame 20.

The impeller 10 is made of an unmagnetized magnetic material and is provided with a rotation shaft 11 disposed on the axial line L of the flow path 6 and a plurality (four in this embodiment) of wing parts 12, 12, . . . provided at equal intervals around the rotation shaft 11 (see FIG. 1). In manufacturing the impeller 10 of this embodiment, metal injection molding (MIM: Metal Injection Molding) using unmagnetized magnetic metal as a material is adopted, and the rotation shaft 11 and the plurality of wing parts 12, 12, . . . are integrally molded at the same time. Furthermore, as the magnetic material for the metal injection molding, magnetic stainless steel (for example, SUS630) can be used.

In this way, since the impeller 10 is produced using metal injection molding in this embodiment, a complex shaped impeller 10 can be molded with high accuracy. Also, the manufacturing cost can be significantly reduced as compared with an impeller made by a cutting process. Furthermore, as compared with an impeller in which a rotation shaft and wing parts are joined, no detachment of a joined portion occurs, and high reliability can be assured even under extreme use conditions.

Figure 4:
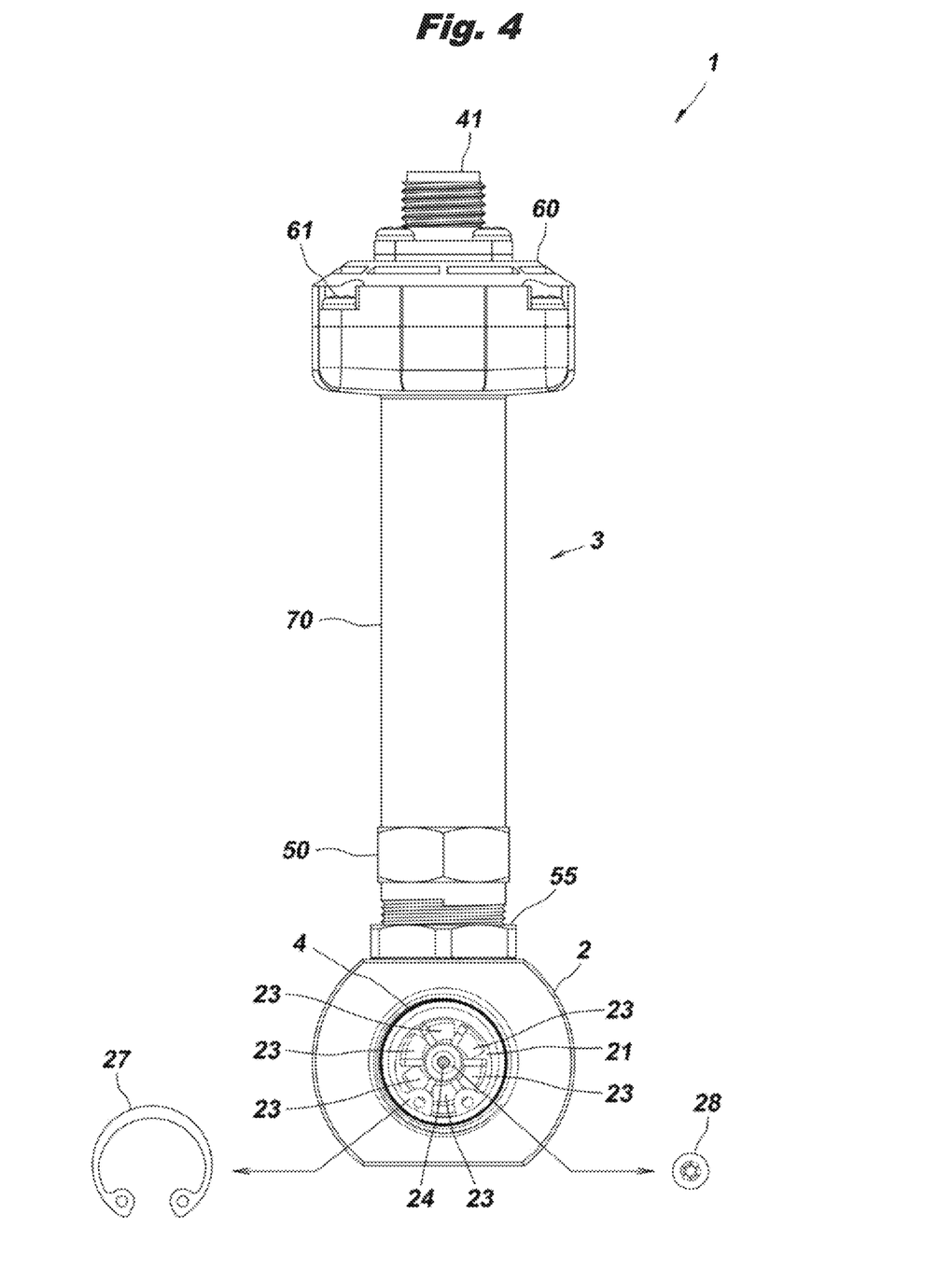
FIG. 4 is a left side view of the flowmeter of FIG. 3.
Figure 5:
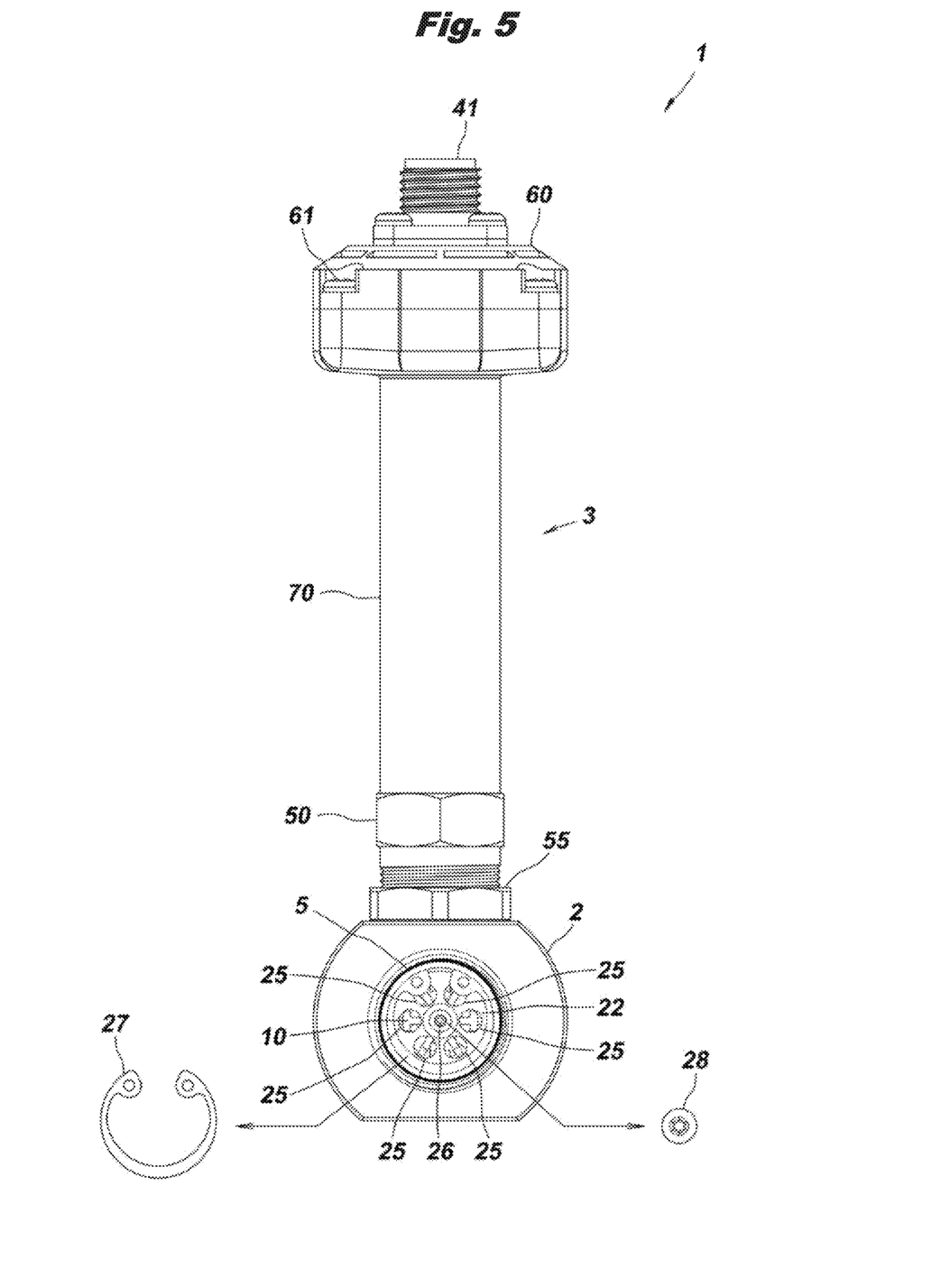
FIG. 5 is a right side view of the flowmeter of FIG. 3.

As shown in FIG. 3, the supporting frame 20 is composed of a rotational flow plate 21 configured to cause a fluid that flows in from the inlet 4 to generate a rotational flow and a rectifier plate 22 configured to rectify the fluid flowing out to the outlet 5. The rotational flow plate 21 is made of nonmagnetic metal (for example, SUS316), and is provided with a plurality of blade parts 23, 23, . . . (see FIG. 4) on the outside and a bearing 24 supporting one end of the rotation shaft 11 in the inner center. Since the rotational flow plate 21 is molded by metal injection molding using nonmagnetic metal as a material, a rotational flow structure having a heat resistant and a complex shape can be realized with high accuracy. The rectifier plate 22 is also made of nonmagnetic metal (for example, SUS316), and is provided with a plurality of circular through-holes 25, 25, . . . (see FIG. 5) on the same circumference and a bearing 26 supporting the other end of the rotation shaft 11 in the inner center.

In this embodiment, the rotational flow plate 21 and the rectifier plate 22 are fixed to the flow path 6 and retained by fitting a C-shaped curved retaining rings 27 and 27 (see FIG. 4 and FIG. 5) made of metal such as stainless steel (for example, SUS304) in the grooves 7 and 7 of the body 2 and pressing from both left and right sides toward the inside of the flow path 6. Therefore, loosening of screws, peeling of adhesives, etc., do not occur even when heat shrinkage occurs due to the temperature difference of the fluid, and rattling of the rotational flow plate 21 and the rectifier plate 22 can be suppressed, which can prevent occurrence of the displacement of the supporting frame 20 in the thrust direction.

Also, in this embodiment, the bearings 24 and 26 are made of special resin (for example, polyimide) that is a different material from the supporting frame 20. The shaft end portions of the bearings 24 and 26 are press-fitted into the metallic (for example, SUS304) push nuts 28, and are fixed to the end faces of the rotational flow plate 21 and the rectifier plate 22. Therefore, the bearings 24 and 26 do not come off the supporting frame 20 even when there is an abrupt temperature change of the fluid, which can stably support the impeller 10.

The flowmeter 1 is equipped with a pickup coil 30 for detecting the number of rotations of the impeller 10 at the outside of the body 2. The pickup coil 30 is a magnetic sensor composed of a resin (for example, PPS) bobbin 31, a magnetic stainless core 32 provided at the center of the bobbin 31, and a heat resistant enameled wire coil 33 wounded on the outer periphery of the bobbin 31.

The pickup coil 30 generates a magnetic field when an electrical current is flowed to the coil 33 from the amplifier circuit board 40 via the power supply conducting wire 34, changes the magnetic flux density when the wing parts 12 of the impeller 10 made of a unmagnetized magnetic material pass by the vicinity of the coil 33, and outputs a detection signal of alternating current waves by the induced electromotive force generated in the coil 33. Here, since the impeller 10 is made of an unmagnetized magnetic material and the pickup coil 30 is disposed outside the flow path 6, even when iron powder, etc., is included in the fluid flowing through the flow path 6, the iron powder, etc., would not be adhered to and accumulated on the wing parts 12 to prevent the smooth rotation of the impeller 10, so the measurement accuracy of the flowmeter 1 can be secured.

Also, the detection signal output from the pickup coil 30 is transmitted to the amplifier circuit board 40 via the signal conducting wire 35. In the amplifier circuit board 40, the detection signal of the alternating current wave is amplified and shaped and converted into a square wave pulse signal, and the pulse signal is output to the outside via a cable with a connector (not illustrated) connected to a round watertight connector 41. Therefore, the number of rotations of the impeller 10 can be calculated from the output pulse signal and the flow rate of the fluid flowing through the flow path 6 can be measured based on the number of rotations.

In this embodiment, the magnetic sensor composed of the pickup coil 30 and the amplifier circuit board 40 are integrated to constitute the sensor unit 3, and the sensor unit 3 is attached to the outside of the body 2 and has the structure described below so as to be able to cope with an abrupt temperature change.

First, the pickup coil 30 is accommodated in a metallic coil case 50 made of stainless steel (for example, SUS304) having a low thermal conductivity among metals, and is disposed closely to the impeller 10 provided in the flow path 6 via a thin wall part 8 of the body 2. On the other hand, the amplifier circuit board 40 is accommodated in a resin amplifier case 60 made of transparent synthetic resin (for example, PMMA), and the turning on and off of the power LED lamp 42 installed on the amplifier circuit board 40 can be visually checked from the outside of the transparent amplifier case 60.

The coil case 50 may be formed of a metal material of which the thermal conductivity is 100 w/m·K or less. Examples of the material are SUS304, SUS316, Titanium or Titanium Alloy. The case 70 may be formed of a resin material of which the thermal conductivity is 2 w/m·K or less. The case functions to link the coil case 50 to the amplifier case 60, also to insulate the IC located inside the amplifier case 60 from the heat conveyed from the case 50.

Further, a resin case 70 made of synthetic resin (for example, PPS) having an excellent heat resistance is provided so as to extend the distance between the built-in pickup coil 30 and the amplifier circuit board 40, and the coil case 50 and the amplifier case 60 are connected via this case 70. The amplifier case 60 and the case 70 are fixed by screws 61. On the joining surface thereof, an O-ring 62 made of fluororubber, etc., is inserted. In this way, by arranging the resin case 70 between the coil case 50 and the amplifier case 60, the direct transfer of temperature from the body 2 to the amplifier circuit board 40 can be prevented.

The case 70 may be formed of engineering plastic that is developed to enhance its heat resistance. Such a plastic may be called Super Engineering Plastic. Examples of the engineering plastics are:
Polyacrylate (PAR)
Polysulfone (PSF)
Polyethersulfone (PES)
Polyphenylene sulfide (PPS)
Polyether ether ketone (PEEK)
Polyimide (PI)
Polyetherimide (PEI)
fluorocarbon polymers
Liquid crystal polymer (LCP).

Further, when the resin case 70 is directly connected to the body 2, the resin may break due to heat shock of the fluid flowing through the inside of the flow path 6, which may cause damage of the case 70. Therefore, in this embodiment, a metallic coil case 50 made of stainless steel is arranged at the connection portion of the resin case 70 and the metallic body 2. A male screw 51 is provided on the upper periphery of the coil case 50. By fitting, screwing, and connecting the male screw 51 to the female screw 71 of the case 70, the coil case 50 is connected to the case 70. Therefore, the stainless steel coil case 50 having a low thermal conductivity acts as a buffering material and slows the heat transfer, which prevents damage to the case 70 due to heat shock.

Furthermore, inside the case 70, cables such as the power supply conducting wire 34 of the pickup coil 30 and the signal conducting wire 35 are provided, and an insulation material 72 made of elastic foam (for example, nitrile rubber) is provided so as to cover the outer periphery of the cables. Therefore, no convection of air occurs in the space inside the case 70, and even when a high temperature fluid flows through the flow path 6, the heat transfer to the amplifier circuit board 40 can be prevented. On the other hand, even when a low temperature fluid flows through the flow path 6, condensation of the amplifier circuit board 40 can be prevented.

Further, in this embodiment, the following structure is adopted for the purpose of using the pickup coil 30 accurately for a long period of time.

Generally, the pickup coil is a magnetic sensor in which the detection signal to be output is a weak electromagnetic wave and it is easily affected by disturbance noise. As a measure against disturbance noise, in a typical design, the ground conducting wire of the pickup coil is brought outside the case via the amplifier circuit board and connected to the body ground on the outside with a screw using a round terminal. With this, the ground of the body and that of the coil becomes the same electric potential, and the noise on the body is cancelled, thereby allowing stable detection.

However, when a low temperature fluid flows through the flow path in the body, condensation or freezing occurs due to the temperature difference inside and outside the body. Therefore, the round terminal connected to the outside of the body is likely to absorb the moisture in the atmosphere and cause a contact failure such as rusting, and is difficult to electrically connect stably for a long period of time.

Figure 6A:
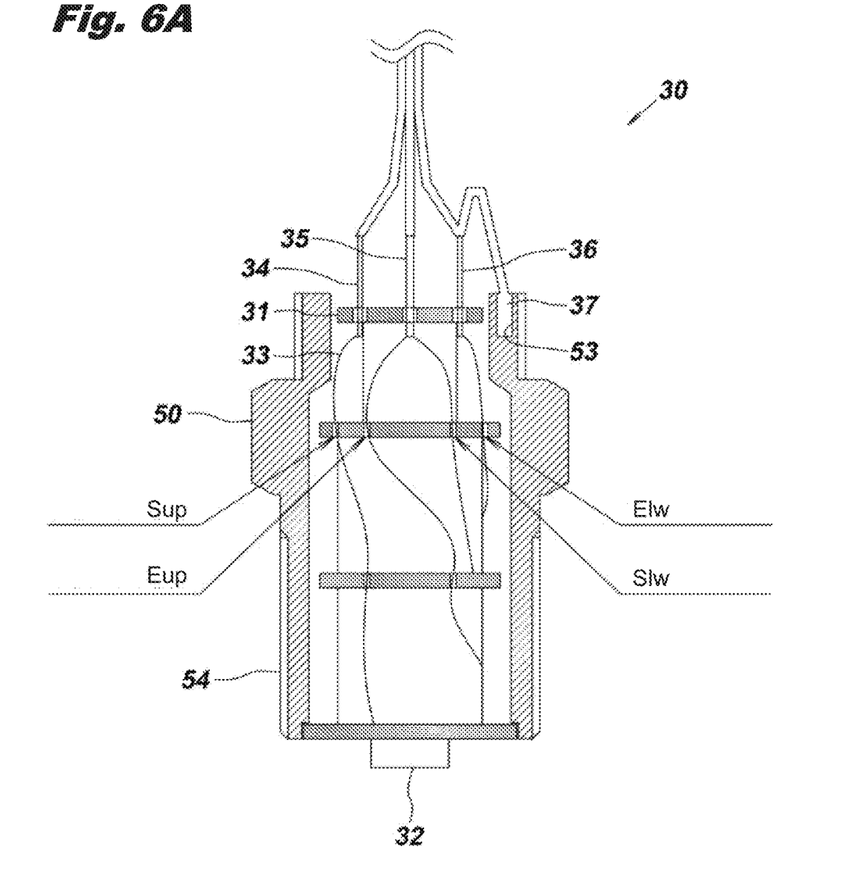
FIG. 6A is a partially enlarged cross-sectional view showing a portion near the pickup coil of the flowmeter of FIG. 3.

Therefore, in this embodiment, the ground conducting wire 36 of the pickup coil 30 is connected to the inside of the metallic coil case 50 having an electric conductivity and the inside of the coil case 50 is filled with a heat-resistant material (for example, heat-resistant epoxy resin) 52. As shown in an enlarged manner in FIG. 6A, for the connection of the ground conducting wire 36, a crimping pin terminal 37 is attached to the tip end, and the crimping pin terminal 37 is inserted into the pin hole 53 of the coil case 50 and soldered for connection. Note that in FIG. 6A, the heat-resistant material 52 is not illustrated in order to make the structure of the pickup coil 30 easier to understand.

Further, a male screw 54 is provided on the lower outer periphery of the coil case 50, and by fitting, screwing, and connecting the male screw 54 to the female screw 9 of the body 2 and tightening it with a lock nut 55, the coil case 50 is strongly connected to the body 2. With this, the ground conducting wire 36 of the pickup coil 30 is electrically connected to the body 2 via the coil case 50.

In this way, the body 2, the coil case 50, and the ground conducting wire 36 are in an electrically connected state and no electrical potential difference occurs between them, so the detection signal output from the coil 33 is less likely to be affected by disturbance noise. Also, since the inside of the coil case 50 is filled with the heat-resistant material 52, when a low temperature fluid flows through the flow path 6 in the body 2, the ground conducting wire 36 in the coil case 50 would not get rusted even when the body 2 condenses, which causes no contact failure. Therefore, the ground conducting wire 36 can be stably electrically connected, and also, the ground conducting wire 36 has a structure in which it is electrically connected to the body 2 via the coil case 50 and can be stably electrically connected at the shortest distance. Therefore, finally, it becomes unlikely to be affected by disturbance noise over a long period of time and the pickup coil 30 can be accurately operated over a long period of time.

Figure 6B:
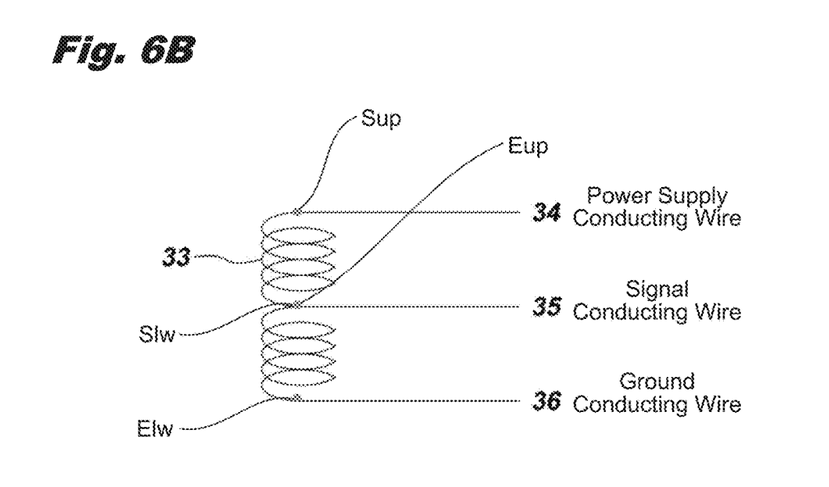
FIG. 6B illustrates a structure of upper and lower coils.

FIG. 6B illustrates a structure of coil 33. In the embodiment, the coil is configured with two sub coils that are upper coil and lower coil, being laterally aligned. Each of the sub coils has a start point and end point. The end of the upper coil (Eup) coincides to the start of the lower coil (Slw), which is linked to the signal conducting wire 35. The start of the upper coil (Sup) is linked to the power supply conducting wire 34. The end of the lower coil (Elw) is linked to the ground conducting wire 36.

In the aforementioned embodiment, as an application of a flowmeter of the present invention, an example used for measuring a flow rate of a fluorine-based inert fluid in a temperature control chiller of a semiconductor manufacturing equipment was exemplified, but it can also be used in other ways such as for measuring a flow rate of a hydraulic equipment. Also, the measurable temperature range was described as −80° C. to +200° C., but in some cases, a temperature outside this range may be measurable based on the type of fluid.

DESCRIPTION OF REFERENCE CHARACTERS

1: flowmeter
2: body
3: sensor unit
4: inlet
5: outlet
6: flow path
7: groove
8: thin wall part
9: female screw
10: impeller
11: rotation shaft
12: wing part
20: supporting frame
21: rotational flow plate
22: rectifier plate
23: blade
24: shaft bearing
25: through hole
26: shaft bearing
27: curved retaining ring
28: push nut
30: pickup coil
31: bobbin
32: core
33: coil
34: power supply conducting wire
35: signal conducting wire
36: ground conducting wire
37: crimping pin terminal
40: amplifier circuit board
41: round watertight connector
42: power LED lamp
50: coil case
51: male screw
52: heat-resistant material
53: pin hole
54: male screw
55: lock nut
60: amplifier case
61: screw
62: O-ring
70: case
71: female screw
72: insulation material

What is claimed is:

1. A flowmeter comprising:
a metallic body that has a flow path therein;
an impeller that is rotatably supported in the flow path inside the body;
a pickup coil that is configured to detect a number of rotations of the impeller, the pickup coil being disposed outside the body;
a coil case that is made of metal, and accommodates the pickup coil;
an amplifier circuit board that is configured to amplify a detection signal of the pickup coil; and
an amplifier case that is made of resin, and accommodates the amplifier circuit board, wherein
the coil case and the amplifier case are connected via a resin case that is made of resin and includes an insulation material therein.

2. The flowmeter according to claim 1, wherein
the coil case is arranged at a connection portion of the body and the connected resin case,
a ground conducting wire of the pickup coil is connected to an inner side of the coil case, and
the coil case is filled with a heat-resistant material therein and connected to the body such that the ground conducting wire is electrically connected to the body via the coil case.

3. The flowmeter according to claim 2, wherein
a supporting frame that supports the impeller is fixed in the flow path with a curved retaining ring.

4. The flowmeter according to claim 3, wherein
a bearing that supports a rotation shaft of the impeller is made of resin and fixed to the supporting frame with a push nut.

5. The flowmeter according to claim 3, wherein
a rotational flow plate that constitutes the supporting frame is molded by metal injection molding using nonmagnetic metal.

6. The flowmeter according to claim 1, wherein
a supporting frame that supports the impeller is fixed in the flow path with a curved retaining ring.

7. The flowmeter according to claim 6, wherein
a bearing that supports a rotation shaft of the impeller is made of resin and fixed to the supporting frame with a push nut.

8. The flowmeter according to claim 6, wherein
a rotational flow plate that constitutes the supporting frame is molded by metal injection molding using nonmagnetic metal.

9. The flowmeter according to claim 1, wherein
a rotation shaft and a wing part that constitute the impeller are integrally molded by metal injection molding using nonmagnetic metal as a material.

* * * * *